(12) United States Patent
Gibbs et al.

(10) Patent No.: US 8,710,800 B2
(45) Date of Patent: Apr. 29, 2014

(54) VEHICLE BATTERY WITH CELL BALANCING CURRENT PATHS AND METHOD OF CHARGING THE SAME

(75) Inventors: James C. Gibbs, Brighton, MI (US); Kurt M. Johnson, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 13/190,741

(22) Filed: Jul. 26, 2011

(65) Prior Publication Data

US 2013/0026989 A1    Jan. 31, 2013

(51) Int. Cl.
*H02J 7/00* (2006.01)

(52) U.S. Cl.
USPC ............................................... 320/116

(58) Field of Classification Search
USPC ............................................... 320/116
See application file for complete search history.

(56) References Cited

U.S. PATENT DOCUMENTS

| 5,952,815 | A * | 9/1999 | Rouillard et al. ............. 320/116 |
| 2004/0169489 | A1* | 9/2004 | Hobbs .......................... 320/104 |
| 2006/0046104 | A1 | 3/2006 | Zimmerman | |

* cited by examiner

*Primary Examiner* — Arun Williams
(74) *Attorney, Agent, or Firm* — Lionel D. Anderson; Reising Ethington P.C.

(57) ABSTRACT

A vehicle battery and charging method that may be used to balance cell voltages during a battery charging operation, and may do so in a way that protects the individual cells from over-charging and improves the overall efficiency of the operation. According to one example, the vehicle battery includes a number of cell-balancing current paths, each of which is connected in parallel to an individual battery cell and can shunt or bypass the corresponding cell when its voltage exceeds some maximum amount. This may enable under-charged battery cells to be charged at the same time that over-charged battery cells are bypassed. Each of the cell-balancing current paths may include a series-connected electronic switch and zener diode combination, where the electronic switch is controlled by a battery control module so that cell-balancing can be enabled during a battery charging operation and disabled at other times.

17 Claims, 4 Drawing Sheets

VEHICLE BATTERY WITH CELL BALANCING CURRENT PATHS AND METHOD OF CHARGING THE SAME

TECHNICAL FIELD

The present invention generally relates to vehicle batteries and, more particularly, to high-voltage vehicle batteries having a number of individual battery cells, such as those found in various types of electric and hybrid vehicles.

BACKGROUND

Battery cells within a vehicle battery pack may exhibit different characteristics. For instance, battery cells located in one part of the battery pack may be subject to different temperatures than those located in a different area of the pack. These and other factors may, in turn, affect the individual cell voltage, current, resistance, state-of-charge (SOC), state-of-health (SOH) and/or other battery cell conditions over time, and can lead to discrepancies between the battery cells so that they are not identical. Another potential source of battery cell discrepancy involves limitations in the manufacturing process, as such a process is not always capable of producing battery packs having perfectly identical cells.

It is usually desirable to maintain a battery pack such that the cell voltages and/or other battery cell conditions are balanced and evenly distributed across the pack; some cell balancing techniques have been developed for this purpose. One such technique involves discharging battery cells that have become overcharged, however, this type of technique may result in a loss of efficiency since some electrical energy is wasted in the discharging process.

SUMMARY

According to one embodiment, there is provided a method of charging a vehicle battery. The method may comprise the steps of: (a) providing a vehicle battery having a plurality of battery cells and a plurality of cell-balancing current paths, each of the cell-balancing current paths is connected in parallel with a corresponding battery cell and includes an electronic switch and a zener diode connected in series; (b) enabling the cell-balancing current paths by closing the electronic switches; and (c) charging the vehicle battery with the cell-balancing current paths enabled, wherein during the charging process one or more of the battery cell(s) are charged and one or more of the battery cells(s) are bypassed via a cell-balancing current path.

According to another embodiment, there is provided a vehicle battery comprising: a plurality of battery cells and a plurality of cell-balancing current paths. Each of the cell-balancing current paths is connected in parallel with a corresponding battery cell and includes an electronic switch and a zener diode connected in series.

According to another embodiment, there is provided a vehicle battery comprising: a battery cell, a cell-balancing current path and a battery control module. The battery cell may include a first and second cell node, the cell-balancing current path may include a first path node, an electronic switch, a zener diode and a second path node connected in series, and the battery control module may include an output coupled to the electronic switch of the cell-balancing current path.

DRAWINGS

Preferred exemplary embodiments will hereinafter be described in conjunction with the appended drawings, wherein like designations denote like elements, and wherein.

DESCRIPTION

The vehicle battery and charging method described herein may be used to balance cell voltages during a battery charging operation, and may do so in a way that protects the individual cells from over-charging and improves the overall efficiency of the operation. According to one potential embodiment, the vehicle battery includes a number of cell-balancing current paths, each of which is connected in parallel to an individual battery cell and can shunt or bypass the corresponding cell when its voltage exceeds some maximum amount. This may enable under-charged battery cells to be charged at the same time that over-charged battery cells are bypassed. Each of the cell-balancing current paths may include a series-connected electronic switch and zener diode combination, where the electronic switch is controlled by a battery control module so that cell-balancing can be enabled during a battery charging operation and disabled at other times. The cell-balancing technique described herein may: increase the energy and power available from the vehicle battery, increase the overall efficiency of the battery charging operation, improve cell-balancing accuracy as it is not dependent on a "one-time" cell reading, and/or improve cell sensing accuracy as it is not affected by discharge current and voltage drops across balancing resistors, to cite a few potential advantages.

Figure 1:
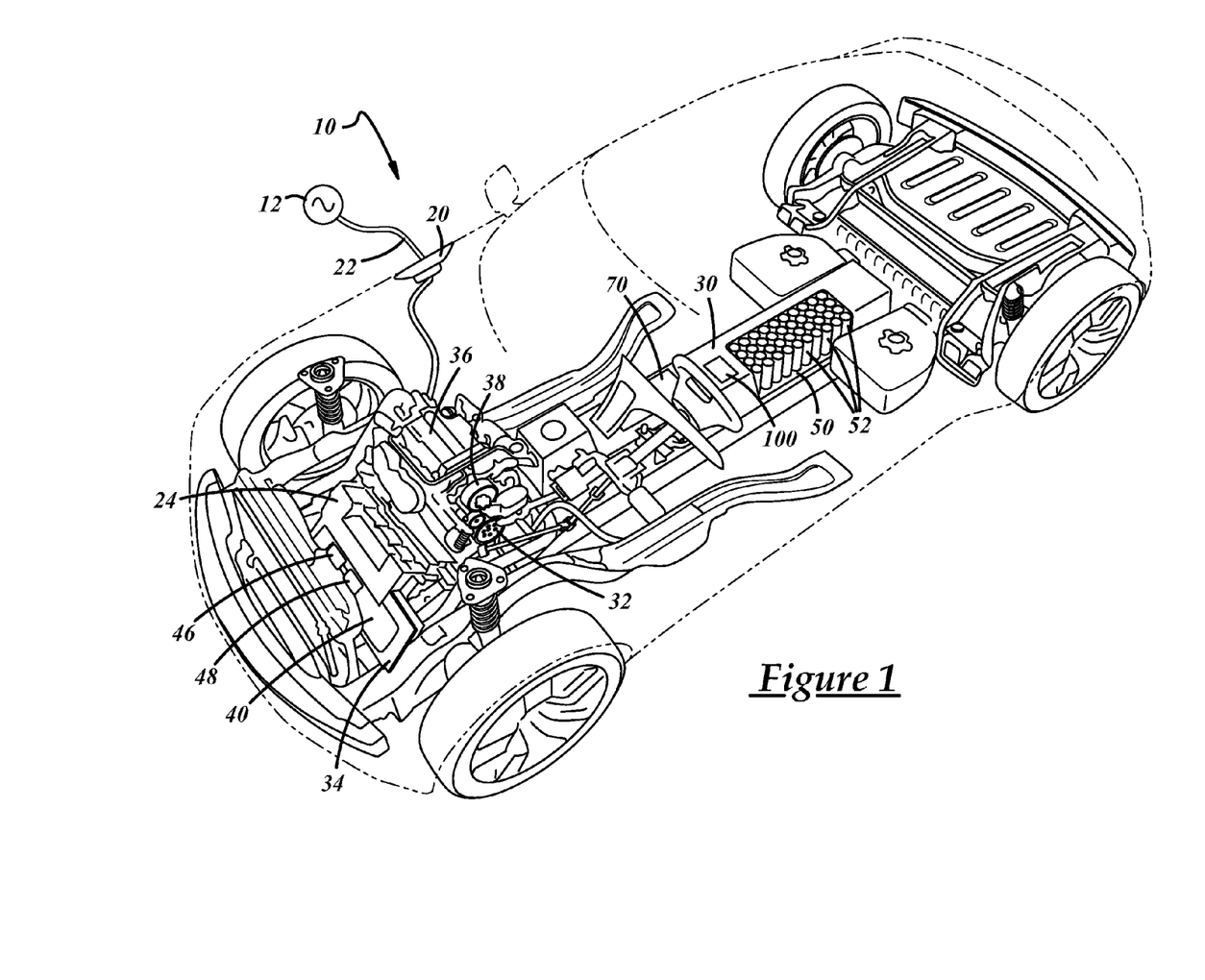
FIG. 1 is a schematic diagram of an exemplary plug-in electric vehicle.

With reference to FIG. 1, there are shown some of the components of an exemplary plug-in electric vehicle 10 that may be used with the cell-balancing method described herein. Although the following description is provided in the context of a particular plug-in electric vehicle, it should be appreciated that this vehicle is merely exemplary and that other vehicles may certainly be used instead. For example, the vehicle battery and charging method described below can be used with any type of vehicle having a high-voltage battery pack, including a hybrid electric vehicle (HEV), a plug-in hybrid electric vehicle (PHEV), an extended-range electric vehicle (EREV), or a battery electrical vehicle (BEV), to cite a few possibilities. Furthermore, the charging method may be applicable to not just batteries, but to other devices that accept electrical charge, such as super capacitors. According to an exemplary embodiment, plug-in electric vehicle 10 interacts with an external power source 12 and includes a power connection 20, a battery charger 24, a battery 30, an electric motor 32, an inverter/converter 34, an engine 36, a generator 38, and a control module 40. Components 20-40 may be fixedly mounted to and located on plug-in electric vehicle 10.

External power source 12 provides plug-in electric vehicle 10 with electrical power over power coupler 22, and may be one of a number of different power supply types known in the art. For example, external power source 12 can be a public electrical utility that provides power via standard power outlets (e.g., 110 VAC or 220 VAC outlets), or it can be a portable generator such as the type that runs on natural gas, propane, gasoline, diesel, or the like. In one embodiment, external power source 12 is a renewable power source, such as a remote charging station powered by energy from solar panels, wind turbines, hydroelectric means, biomass, etc. External power source 12 is not limited to any particular type or embodiment, so long as it can provide electrical power to plug-in electric vehicle 10 over power coupler 22.

Power connection 20 is an electrical inlet on the plug-in electric vehicle into which power coupler 22 can be plugged or inserted. This enables a vehicle owner to easily connect and disconnect plug-in electric vehicle 10 to a common AC wall outlet, for example, such as those commonly found in most garages and charging stations. Power connection 20 is not limited to any particular design, and may be any type of inlet, connection, socket, plug, port, receptacle, etc., including those that are based on conductive, inductive, or other types of electrical connections. Some of these connection types are covered by one or more international standards (e.g., IEC 62196 type 1-2 and mode 1-4, IEC 60309, SAE J1772, etc.). In an exemplary embodiment, power connection 20 is an electrical inlet located on the exterior of plug-in electric vehicle 10 so that it can be easily accessed (e.g., under a hinged door or flap), and includes one or more connections to battery charger 24 for conveying electrical power and one or more connections to control module 40 for communication. Other arrangements and connections are certainly possible.

Power coupler 22 can be used to connect external power source 12 to plug-in electric vehicle 10. Power couplers are sometimes referred to as electric vehicle supply equipment (EVSE) cordets. Power coupler 22, in one embodiment, may be a specialized cordset specifically designed for use with plug-in electric vehicles (such as those described in specifications SAE J-1772 and J-1773), which includes a first end, a cable or cord, a control unit, and a second end. The first end of power coupler 22 is a three-prong connection that plugs into a standard AC wall outlet and its second end is a specifically designed connection that plugs into power connection 20 on the vehicle. The cable conducts or transmits electrical power from external power source 12 to plug-in electric vehicle 10, but may also convey one or more communication signals between a control unit of power coupler 22 and devices located on the vehicle, like control module 40. The control unit of power coupler 22 may include any number of electronic components including, but certainly not limited to, sensors, transceivers, processing devices, memory devices, contactors, switches, ground fault circuit interrupter (GFCI) components, as well as any other suitable component. In an exemplary embodiment, the control unit of power coupler 22 is powered by an external power source, monitors various conditions surrounding the power coupler (e.g., the presence of electrical power, the voltage and/or current of the electrical power, the temperature of the power coupler, etc.), and communicates with control module 40 regarding such conditions. Skilled artisans will appreciate that the method described herein is not limited to any particular power coupler or cordset, as any number of different power couplers could be used.

Charger 24 may receive electrical energy from a variety of sources, including external and/or internal power sources. In the case of an external power source, charger 24 may receive electrical energy through a suitable power coupler or charging cordset 22 that connects external power source 12 to charger 24, as already explained. In the case of an internal power source, charger 24 may receive electrical energy from regenerative braking, a motor-driven generator 38, or some other internal source via connections within the vehicle. Skilled artisans will appreciate that charger 24 may be provided according to any number of different embodiments, may be connected in any number of different configurations, and may include any number of different components, such as transformers, rectifiers, switching power supplies, filtering means, cooling means, sensors, control units and/or any other suitable components known in the art.

Electric motor 32 may use electrical energy stored in vehicle battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Vehicle 10 is not limited to any one particular type of electric motor, as many different motor types, sizes, technologies, etc. may be used. In one example, electric motor 32 includes an AC motor (e.g., a three-phase AC induction motor, a multi-phase AC induction motor, etc.), as well as a generator that can be used during regenerative braking. Electric motor 32 may be provided according to any number of different embodiments (e.g., AC or DC motors, brushed or brushless motors, permanent magnet motors, etc.), it may be connected in any number of different configurations, and it may include any number of different components, like cooling features, sensors, control units and/or any other suitable components known in the art.

Inverter/converter 34 may act as an intermediary between vehicle battery 30 and electric motor 32, as these two devices are often times designed to function according to different operational parameters. For example, during vehicle propulsion inverter/converter 34 may step-up the voltage from battery 30 and convert the current from DC to AC in order to drive electric motor 32, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device; however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Engine 36 may drive generator 38 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 36 is a small fuel-efficient engine (e.g., a small displacement, turbo-charged four-cylinder engine) that uses its mechanical output to turn generator 38. Skilled artisans will appreciate that engine 36 may be provided according to any number of different embodiments, may be connected in any number of different configurations (e.g., engine 36 could be part of a parallel hybrid system where the engine is also mechanically coupled to the vehicle wheels instead of exclusively being used to generate electricity), and may include any number of different components, like sensors, control units and/or any other suitable components known in the art.

Generator 38 is mechanically coupled to engine 36 so that the mechanical output of the engine causes the generator to create electrical energy that may be provided to vehicle battery 30, electric motor 32, or both. It is worth noting that generator 38 may be provided according to any number of different embodiments (e.g., the generator of motor 32 and generator 38 may be combined into a single unit), may be connected in any number of different configurations, and may include any number of different components, like sensors, control units and/or any other suitable components known in the art. Generator 38 is not limited to any specific generator type or embodiment.

Control module 40 may be used to control, govern or otherwise manage certain operations or functions of vehicle 10 and, according to one exemplary embodiment, includes a processing device 46 and a memory device 48. Processing device 46 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 48 may include any type of suitable electronic memory means and may store a variety of data and information. This includes, for example: sensed battery conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 48. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible. Depending on the particular embodiment, control module 40 may be a stand-alone electronic module (e.g., a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities.

Again, the preceding description of exemplary plug-in electric vehicle 10 and the drawing in FIG. 1 are only intended to illustrate one potential vehicle arrangement and to do so in a general way. Any number of other vehicle arrangements and architectures, including those that differ significantly from the one shown in FIG. 1, may be used instead.

Figure 2:
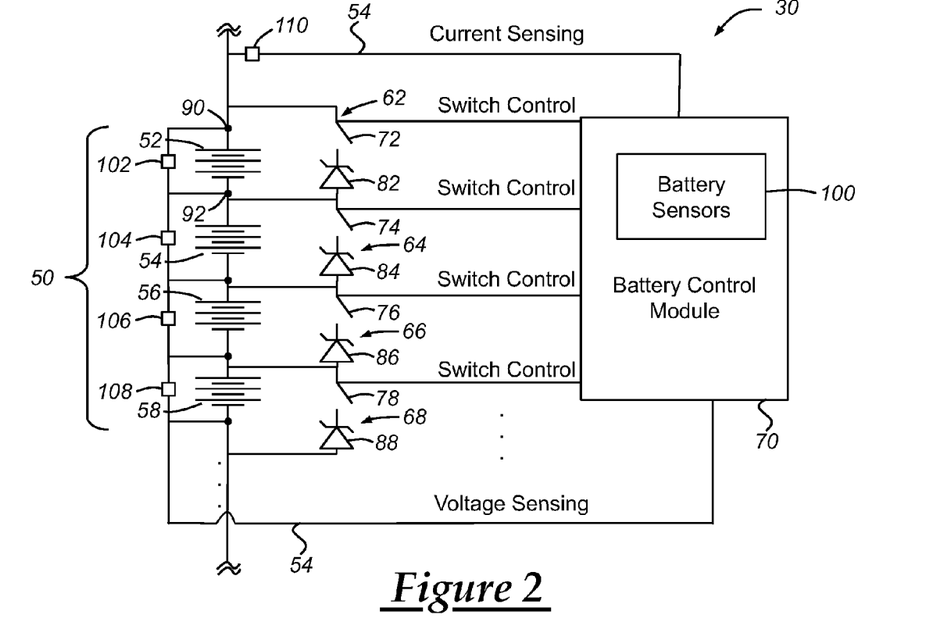
FIG. 2 is a schematic block diagram of a portion of an exemplary vehicle battery which may be used with a plug-in electric vehicle, such as the one illustrated in FIG. 1.

Turning now to FIG. 2, there is shown a schematic representation of part of an exemplary vehicle battery 30 that can be used to provide power to vehicle 10. Vehicle battery 30 may store electrical energy that is at least partially used for vehicle propulsion, as well as to meet the other electrical needs of the vehicle. According to an exemplary embodiment, battery 30 includes a high-voltage battery pack 50 (e.g., 40V-600V) having a number of individual battery cells 52-58, a number of cell-balancing current paths 62-68, and a battery control module 70. Battery pack 50 includes a collection of individual battery cells 52-58 that may be connected in series, parallel, or a combination of both in order to deliver a desired voltage, amperage, capacity, power density, and/or other performance characteristics. In the particular example shown in FIG. 2, battery cells 52-58 are wired in series with one another. Battery pack 50 may utilize any suitable battery chemistry, including those that are based on the following technologies: lithium ion, nickel metal hydride (NiMH), nickel cadmium (NiCd), sodium nickel chloride (NaNiCl), or some other battery technology. According to one example, battery pack 50 includes a number of lithium-ion battery cells. Battery pack 50 should be designed to withstand repeated charge and discharge cycles and may be used in conjunction with other energy storage devices, such as capacitors, super capacitors, inductors, etc. Those skilled in the art will appreciate that the vehicle battery may be provided according to any number of different embodiments, may be connected in any number of different configurations, and may include any number of different sub-components, like sensors, control units and/or any other suitable components known in the art.

Cell-balancing current paths 62-68 are connected in parallel to battery cells 52-58, respectively, and provide paths for shunting or bypassing cells when their voltage exceeds some threshold. Each cell-balancing current path includes an electronic switch 72-78 connected in series with a zener diode 82-88. For example, cell-balancing current path 62 is connected between first and second nodes 90 and 92 of battery cell 52, and includes electronic switch 72 connected in series with zener diode 82. If electronic switch 72 is 'closed' and the voltage on battery cell 52 exceeds the breakdown voltage of zener diode 82, then electrical current from a battery charging operation may bypass cell 52 by flowing through switch 72 and diode 82; this prevents battery cell 52 from being charged any further. The same concept applies to the other battery cells and cell-balancing current paths so that, during a battery charging operation, lower-voltage cells may be charged while at the same time higher-voltage cells are bypassed. This selective charging process enables cell-balancing within battery 30 so that the cell voltages become more even or uniform, as will be explained below in more detail.

Electronic switches 72-78 are electrical components that selectively break an electrical circuit, as is widely understood in the art, and may be any suitable type of switch, transistor, etc. Switches 72-78 may operate in one of two states; a 'closed' or 'on' state where electricity flows between the terminals of the switch, or an 'open' or 'off' state where electricity does not flow. Some examples of suitable switch or transistor types for switches 72-78 include, but are certainly not limited to, bipolar junction transistors (BJTs) and all types of field-effect transistors (FETs), such as metal-oxide-semiconductor field-effect transistors (MOSFETs) and junction gate field-effect transistor (JFETs). Electronic switches 72-78 are not limited to any particular switch or transistor type. In a non-limiting example, each of the switches 72-78 is an NPN bipolar junction transistor (BJT) that includes collector and emitter terminals for conducting current, a base terminal connected to battery control module 70 for receiving a control signal, and a current threshold of approximately 5-10 amps (this enables 110V or 220V off-board charging). The control signal controls the state of the switch and can either turn it 'on' or 'off'.

Zener diodes 82-88 are electrical components that permit current flow in a forward direction, like a typical diode, and also permit current flow in a reverse direction when the voltage across the diode exceeds a breakdown or Zener voltage.

The structure and operation of Zener diodes are widely understood by skilled artisans and are therefore not repeated here. According to the exemplary embodiment illustrated in FIG. 2, zener diode 82 is part of cell-balancing current path 62 and is connected such that electrical current only flows in the current path from first cell node 90 to second cell node 92 when switch 72 is closed and the voltage across battery cell 52 exceeds the zener breakdown voltage. Once these conditions are met, current is free to flow in cell-balancing current patch 62 and bypasses battery cell 52 so that it is not charged further. In one non-limiting example, each of the zener diodes 82-88 has a current threshold of about 5-10 amps and a breakdown voltage of about 3.0V-5.0V. Other types of electrical components may also be used in the cell-balancing current paths, as the zener diodes shown here are only one example.

Battery control module 70 may include any variety of electronic processing devices, memory devices, input/output (I/O) devices, and other known components, and may perform various control and/or communication related functions. For example, battery control module 70 may receive sensor signals from various battery sensors 100 and evaluate, analyze and/or process the sensor signals in an effort to control one or more aspects of battery 30. Using the sensor signals to control the state of electronic switches 72-78 is one example of a suitable function for battery control module 70. In another example, battery control module 70 receives and packages the sensor signals from battery sensors 100 into a sensor message, and then sends the sensor message to control module 40 or some other device over a suitable connection, such as a CAN bus, a system management bus (SMBus), a proprietary communication link, etc. It is possible for battery control module 70 to gather battery sensor readings and store them in local memory along with pertinent battery characteristics and background information pertaining to the battery's cell chemistry, cell capacity, upper and lower battery voltage limits, battery current limits, battery temperature limits, temperature profiles, battery impedance, number or history of charge/discharge events, etc. It should be appreciated that battery control module 70 may be a stand-alone electronic module, it may be incorporated or included within another electronic module in the vehicle (e.g., control module 40), it may be part of a larger network or system, it may be located within the vehicle battery, or it may be external to the battery, to name a few possibilities. Battery control module 70 is not limited to the schematic illustration shown in FIG. 2 and described above. In one embodiment, battery control module 70 includes one or more battery sensors 100.

Battery sensors 100 may include any variety of different sensing components or elements, and may monitor a variety of battery conditions such as voltage, current, state of charge (SOC), state of health (SOH), temperature, etc. Battery sensors 100 may include sensors that are integrated within vehicle battery 30 (e.g., an intelligent or smart battery), are externally located outside of the battery, or are provided according to some other known arrangement. Battery sensors 100 may monitor, sense or otherwise determine battery conditions on a cell-by-cell basis, as an average of a collection or block of cells or region of the battery pack, as an average of the entire battery pack, or according to some other method known in the art. In an exemplary embodiment, battery sensors 100 include voltage sensors 102-108 for sensing individual cell voltage, a current sensor 110 for sensing current flow through the battery pack, and any number of other sensors like temperature sensors, etc. Sensors 102-110 may be connected to battery control module 70, control module 40 or to any other suitable device.

Figure 3:
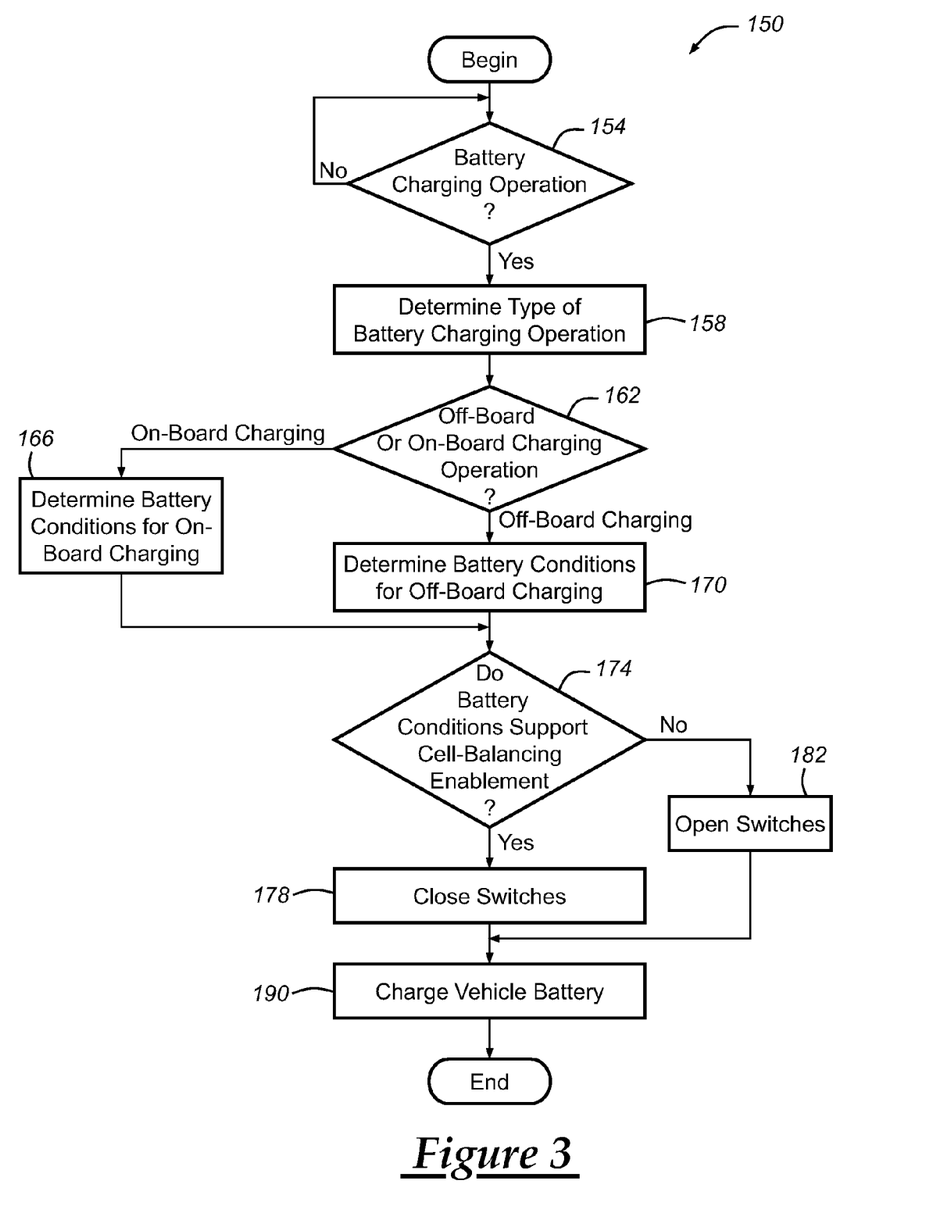
FIG. 3 is a flowchart showing some of the steps of an exemplary method that may be used to charge a vehicle battery, such as the one illustrated in FIG. 2.

Turning now to FIG. 3, there are shown some of the steps of an exemplary method 150 for charging a vehicle battery, such as the one illustrated in FIGS. 1 and 2. Method 150 may be used to balance cell voltages during a battery charging operation, and may do so in a way that protects the individual cells from over-charging and improves the overall efficiency of the operation. As previously mentioned, method 150 provides a charging scheme that balances the cell voltages across the battery pack by charging under-charged cells and, at the same time, bypassing or shunting over-charged cells. Method 150 can be performed during any battery charging operation, which may include 'off-board charging operations' (e.g., when the vehicle is plugged into external power source 12), 'on-board charging operations' (e.g., when the vehicle is experiencing regenerative braking or is being charged with generator 38), or any other suitable charging operation.

Beginning with step 154, the method determines if the vehicle is currently experiencing a battery charging operation, and may do so in a number of different ways. According to one example, step 154 detects an off-board charging operation or event when power coupler 22 is electrically connected between external power source 12 and power connection 20. This connection can be detected or sensed by power connection 20, power coupler 22 or some other device, and can be conveyed to battery control module 70 via an appropriate electronic message. In a different example, step 154 detects an on-board charging operation in response to a regenerative braking event (e.g., a brake control module or the like could send a regenerative braking message to battery control module 70) or in response to charging by the engine-driven generator 38. Other embodiments are also possible. If the method determines that a battery charging operation is occurring, then the method proceeds to the next step; otherwise, the method loops back to step 154 for further monitoring.

Next, step 158 determines the type of battery charging operation or event. As mentioned above, charging events may be classified into several different categories, including off-board charging operations and on-board charging operations. An 'off-board charging operation' broadly includes any charging event where the source of the charging is external to the vehicle (e.g., charging from external power supply 12). An 'on-board charging operation', on the other hand, broadly includes any charging event where the source of the charging is internal to the vehicle (e.g., charging from regenerative braking operations or charging from generator 38). Any of the techniques used in step 154 for detecting a battery charging operation may be employed, utilized or combined with step 158 in order to determine the type or nature of the charging operation. Skilled artisans should appreciate that other embodiments are also possible, as steps 154 and 158 are not limited to the examples provided herein.

Depending on the nature of the charging operation, step 162 directs the method along one of several different paths. For instance, if the battery charging operation is an on-board charging operation then the method proceeds to step 166; if the battery charging operation is an off-board charging operation then the method proceeds to step 170. Cell balancing may not always be appropriate or desired, even during battery charging operations. Thus, steps 166 and 170 gather and evaluate various battery conditions and/or parameters in order to determine if cell-balancing features should be enabled at that time—cell-balancing is generally "enabled" when battery control module 70 closes electronic switches 72-78. Each cell-balancing current path 62-68 should be able to handle the full battery pack current (e.g., the current detected by current sensor 110), as the battery pack current could flow through any current path that has been enabled and whose zener diode is operating in the reverse direction. It may therefore be useful for the method to consider the anticipated battery pack current and/or other battery conditions before closing electronic switches 72-78 and enabling the cell-balancing features. On-board and off-board charging operations may require different battery conditions or criteria for making this determination, thus, the need for steps 166 and 170.

For example, off-board charging with an external power source 12 is typically a more stable and predictable source of power than regenerative braking, which can vary significantly in terms of the voltage and/or current supplied. If step 162 determines that an off-board charging operation is currently underway, then step 170 may simply check to make sure that the overall pack voltage has not exceeded a certain threshold or it may evaluate some other battery condition before the method enables cell-balancing features by closing electronic switches 72-78. If, on the other hand, step 162 determines that there is an on-board charging operation currently being performed, then step 166 may consider more stringent battery conditions and criteria before enabling cell-balancing. One such battery condition could involve the amount of current through battery pack 50, as measured by current sensor 110. Because regenerative braking events (i.e., an on-board charging operation) can result in temporary current surges, step 166 may want to ensure that the battery current is below some current threshold (e.g., less than 7 amps) before enabling cell-balancing via switches 72-78. Otherwise, each of the cell-balancing current paths 62-68, including electrical switches 72-78 and zener diodes 82-88, would have to be equipped to handle the full amount of electrical current through the battery pack. This can add unwanted cost to the system.

In an exemplary embodiment, steps 166 and 170 use different battery conditions for determining if and when cell-balancing should be enabled, where step 166 generally uses more stringent or limiting criteria. Examples of battery conditions that may be used by steps 166 and/or 170 include: battery pack current, battery pack voltage, battery pack state-of-charge (SOC), battery pack temperature, battery pack estimated charge time, as well as similar criteria based on a cell level instead of a pack level. As mentioned above, the method may want to keep cell-balancing features disabled (i.e., electronic switches 72-78 open) when the battery is experiencing an on-board charging operation that is generating battery pack current in excess of some threshold. The battery conditions used in steps 166 and/or 170 to determine if and when to enable the cell-balancing features of the system may be static (e.g., determined during battery and/or vehicle manufacturing), dynamic (e.g., determined by battery control module 70 during operation in order to account for changes in battery conditions, etc.) or predetermined during manufacture and adjusted during operation, to cite a few examples. Moreover, the various criteria may take into consideration factors that can affect measured values including hysteresis, diffusion, etc.

Step 174 checks if the battery conditions are satisfied before enabling the cell-balancing features. In either the on-board or the off-board charging operation scenario, step 174 determines if the various battery conditions are satisfied, and may do so in any number of different ways. In one embodiment, step 174 evaluates some combination of the following battery conditions: is the overall battery current less than a current threshold, is the minimum cell voltage less than a voltage threshold, and/or is an estimated time of charging less than a charging time threshold. If, for example, the answer to all of these inquiries is yes, then step 174 may determine that cell-balancing for an off-board charging operation is appropriate. In an on-board charging operation example, step 174 may calculate the electrical current needed to bring the highest charged battery cell to the corresponding zener breakdown voltage and then determine if the present battery current is less than the calculated current plus a hysteresis value. In some instances, step 174 may need to satisfy all battery conditions in order to enable cell-balancing; in other instances, the step may only need to satisfy some of the battery conditions. If step 174 determines that the requisite battery conditions have been meet, then the method proceeds to step 178 for cell-balancing enablement; if step 174 determines that the battery conditions have not been met, then the method proceeds to step 182 for cell-balancing disablement (this could involve opening switches 72-78 or keeping them maintained in an open state). It should be appreciated that steps 162-174 are optional and that any combination of these steps may be omitted or replaced. To illustrate, it is possible for the method to simply close electronic switches 72-78 and enable cell-balancing whenever a charging event is detected, instead of distinguishing between on-board and off-board charging operations and evaluating battery conditions accordingly, as explained above.

Step 178 closes one or more electronic switches so that cell-balancing features are enabled. This step may be performed in a number of different ways, all of which are possibilities. For instance, in step 178, battery control module 70 may send switch control signals to electronic switches 72-78 so that they are closed or turned 'on' at once (this enables all of the cell-balancing current paths at the same time), or the control module could control the switches on an individual basis so that some are turned closed and some are open. In an exemplary embodiment, electronic control module 70 closes all of the electronic switches 72-78 at the same time, thereby enabling all of the cell-balancing current paths. Likewise, step 182 opens one or more of the electronic switches so that at least some of the cell-balancing current paths are disabled. Skilled artisans will appreciate that just because a particular cell-balancing current path is enabled, does not necessarily mean that it will conduct current and bypass the corresponding battery cell; the cell voltage has to exceed the breakdown voltage of the zener diode first.

Figure 4:
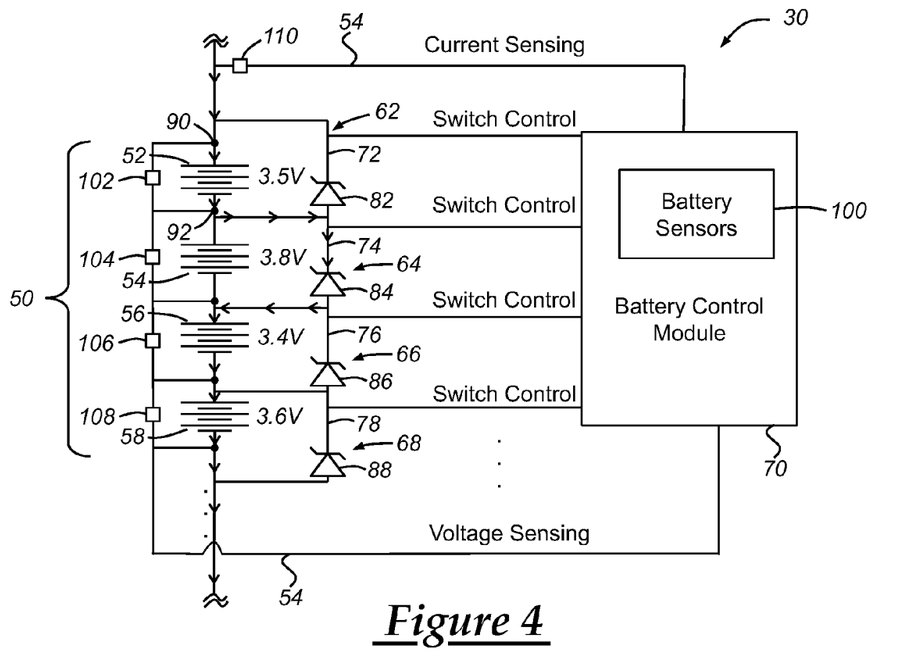
FIG. 4 is another view of the vehicle battery in FIG. 2, however, the various electronic switches have been turned 'on' by the battery control module and certain cell-balancing current paths have been highlighted in order to help illustrate the method in FIG. 3.

Once the electronic switches have been closed or opened, step 190 charges vehicle battery 30. Even with all of the cell-balancing current paths enabled, whether or not current charges a particular battery cell or bypasses it is largely dependent on the cell voltage. To illustrate this point, consider the example illustrated in FIG. 4, where it is assumed that battery cells 52, 54, 56 and 58 have cell voltages of 3.5V, 3.8V, 3.4V and 3.6V, respectively, and all of the zener diodes have a breakdown voltage of 3.8V. In addition, FIG. 4 has been modified to show an exemplary arrowhead current path. Battery cells 52, 56 and 58 all have cell voltages that are lower than the breakdown voltage of the corresponding zener diode; thus, cell-balancing current paths 62, 66 and 68 are not conductive as their zener diodes are operating in the forward direction, and current is flowing through and charging cells 52, 56 and 58. Cell-balancing current path 54, however, is conductive because the cell voltage for cell 54 is 3.8V, which is at the zener breakdown voltage level. This current path is illustrated in FIG. 4 and acts to bypass or shunt battery cell 54 so that it cannot be charged any further; that is, the voltage of battery cell 54 is clamped at 3.8V. If the cell voltage of any of the other battery cells 52, 56 and 58 reaches 3.8V, then cell-balancing current paths 62, 66 and 68 will become conductive and bypass their corresponding battery cell. If at any time the method determines that the current battery conditions are not appropriate for cell-balancing, then battery control module 70 can send switch control signals to switches 72-78 to open the switches and disable the cell-balancing features. Skilled artisans will recognize that one or more additional cell-balancing techniques may be used in lieu of or in conjunction with the exemplary method described above, including discharging over-charged cells to achieve cell balancing.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of charging a vehicle battery, comprising the steps of:
    (a) providing a vehicle battery having a plurality of battery cells and a plurality of cell-balancing current paths, each of the cell-balancing current paths is connected in parallel with a corresponding battery cell and includes an electronic switch and a zener diode connected to one another in series;
    (b) enabling the cell-balancing current paths by closing the electronic switches; and
    (c) charging the vehicle battery with the cell-balancing current paths enabled, wherein during the charging process at least one of the battery cells is charged and at least one of the battery cells is bypassed via a cell-balancing current path that conducts current through an electronic switch and a zener diode connected to one another in series.

2. The charging method of claim 1, further comprising the step of:
    determining if there is a battery charging operation and, if there is a battery charging operation, then performing one or more of steps (b)-(c).

3. The charging method of claim 2, further comprising the step of:
    determining if the vehicle battery is currently experiencing an on-board charging operation or an off-board charging operation, evaluating one or more battery condition(s) for enabling the cell-balancing current paths and, if the battery condition(s) are satisfied, then performing one or more of steps (b)-(c).

4. The charging method of claim 3, wherein the battery condition(s) for on-board charging operations are different than the battery condition(s) for off-board charging operations.

5. The charging method of claim 3, wherein the battery condition(s) for on-board charging operations include a vehicle battery pack current.

6. The charging method of claim 1, wherein step (b) further comprises enabling the cell-balancing current paths by sending one or more switch control signal(s) from a battery control module to the electronic switches.

7. The charging method of claim 6, wherein the switch control signal(s) from the battery control module close all of the electronic switches at the same time so that all of the cell-balancing current paths are enabled.

8. The charging method of claim 6, wherein the switch control signal(s) from the battery control module close some of the electronic switches so that some of the cell-balancing current paths are enabled and some of the cell-balancing current paths are disabled.

9. The charging method of claim 1, wherein step (c) further comprises charging a first group of one or more battery cell(s) and at the same time bypassing a second group of one or more battery cell(s), and the second group of battery cell(s) are bypassed through the cell-balancing current paths.

10. The charging method of claim 9, wherein the second group of battery cell(s) are bypassed through cell-balancing current paths that each includes an electronic switch in a closed state and a zener diode operating in a reverse direction.

11. The charging method of claim 1, further comprising the steps of:
    monitoring one or more battery condition(s) of the vehicle battery; and
    disabling the cell-balancing current paths by opening the electronic switches when one or more battery conditions change.

12. The charging method of claim 1, wherein the method balances the voltages of the plurality of battery cells without discharging any of the battery cells.

13. A vehicle battery, comprising:
    a plurality of battery cells; and
    a plurality of cell-balancing current paths, each of the cell-balancing current paths is connected in parallel with a corresponding battery cell and includes an electronic switch and a zener diode connected to one another in series;
    wherein each of the cell-balancing current paths is arranged to bypass the corresponding battery cell when the electronic switch is closed and a voltage on the corresponding battery cell exceeds a breakdown voltage of the zener diode.

14. The vehicle battery of claim 13, further comprising:
    a battery control module being connected to the plurality of electronic switches, wherein the battery control module controls the state of each of the electronic switches through a control signal.

15. The vehicle battery of claim 14, wherein the battery control module controls the states of the plurality of electronic switches in unison so that all of the electronic switches are closed during a battery charging operation.

16. The vehicle battery of claim 13, further comprising:
    a first cell-balancing current path being connected in parallel with a first battery cell and having an electronic switch that is closed and a zener diode that is operating in a reverse state; and
    a second cell-balancing current path being connected in parallel with a second battery cell and having an electronic switch that is closed and a zener diode that is operating in a forward state, the first battery cell has a higher cell voltage than the second battery cell;

wherein during a battery charging operation, the first cell-balancing current path is conductive and prevents the first battery cell from charging while the second cell-balancing current path is not conductive and allows the second battery cell to charge.

17. A vehicle battery, comprising:

a battery cell having a first and second cell node;

a cell-balancing current path having a first path node, an electronic switch, a zener diode and a second path node connected in series, wherein the first path node of the cell-balancing current path is connected to the first cell node of the battery cell and the second path node of the cell-balancing current path is connected to the second cell node of the battery cell so that the cell-balancing current path is connected in parallel with the battery cell; and a battery control module having an output coupled to the electronic switch of the cell-balancing current path, wherein the cell-balancing current path shunts the battery cell when the battery control module has closed the electronic switch and the voltage of the battery cell exceeds a breakdown voltage of the zener diode.

* * * * *